United States Patent [19]

Crawford

[11] 4,117,873
[45] Oct. 3, 1978

[54] GROOVED-GEAR WIRE PULLER

[76] Inventor: George W. Crawford, 14 Commerce St., Chatham, N.J. 07928

[21] Appl. No.: 790,761

[22] Filed: Apr. 25, 1977

[51] Int. Cl.$^2$ ............................................. B21F 1/04
[52] U.S. Cl. ............................. 140/105; 254/134.3 R
[58] Field of Search ............... 140/105, 106; 226/187; 72/196; 254/134.3 R

[56] References Cited

U.S. PATENT DOCUMENTS

| 689,449 | 12/1901 | Zimmerman | 140/106 |
| 2,914,643 | 11/1959 | Fields et al. | 140/105 |
| 3,016,451 | 1/1962 | Cornell, Jr. | 226/187 |

*Primary Examiner*—Lowell A. Larson
*Attorney, Agent, or Firm*—J. Harold Kilcoyne

[57] ABSTRACT

A grooved-gear wire puller comprising a pair of spur-type gears, one thereof being urged into tooth meshing relationship with the other gear of the pair which latter is positively driven, the teeth of said gear pair being grooved and the grooves thereof being disposed in mutually facing relationship thereby defining an aperture between intermeshing teeth for the acceptance of a pair (or plural pairs) of twisted wires to be pulled directed thereinto, the depth and configuration of said grooves being such that the intermeshing teeth successively grip the pair of wires with substantial force and simultaneously deform the said wire pair out of its entering plane and in manner as to impart of succession of closely spaced crimps in the twisted wire pair exiting from between the intermeshing teeth.

3 Claims, 6 Drawing Figures

GROOVED-GEAR WIRE PULLER

STATEMENT OF THE INVENTION

This invention relates to improvement in wire pulling apparatus and, although designed specifically to pull cotton or polyvinylchloride covered wire of approximately 0.050 inches diameter, two at a time in twisted pairs, at a velocity of approximately 120 feet per minute, apparatus according to the invention has much wider application.

BACKGROUND OF THE INVENTION

As conducive to an understanding of the invention and the want in the art which it satisfies, it is explained that in telephone-system parlance, a "frame" mounts all of the connection equipment for telephones serving a given area, as well as the connection equipment between buildings and other areas. In other words, the frame is the 'locus' or component at which individual telephones in an area are connected via the connection equipment to give the dial tone when a telephone user wishes to make a call.

A typical "frame" usually comprises a series of superimposed horizonally extending elongate shelves (called planes), on one side of which is mounted a multiplicity of terminals, a particular one of which when a customer orders a telephone connected, is connected to a terminal on or near the other side or edge of the frame. In making this connection, the "frame man" (so called) lays on one of the shelves a pair of wires which in length may vary widely, say from 10 feet to 200 feet, or any length in between, and connects same to a terminal located on the other side or edge of the frame shelf.

When a customer requests a so-connected telephone to be disconnected, an order is eventually given to the frame man to disconnect the wire extending between the terminals on each side of the frame. It has happened frequently in the past that the frame man, upon disconnection having been effected, leaves the wire extending between the disconnected terminals in the frame in a non-used condition. The result is that on many frames the wires which are not in use are so numerous as to result in the frames in effect being "dead", a condition which in turn results in gross underutilization of the connection equipment previously served by the frame.

To salvage an existing "dead" frame, the multiplicity of disconnected wires must be pulled therefrom, but such poses a problem due to the fact that the job of manually pulling wires out of the frame is very tedious, tiring and time consuming, present estimates being that a man working on a steady 8-hour day basis, which is almost an impossibility, can pull only about 40 lbs. of wire in a day's time. The result of the foregoing is that no major effort is being made to pull the disconnected wire from the frame manually.

An earlier effort to develop a mechanical means for pulling disconnected wire as aforesaid from a "dead" frame was one embodying the Capstan principle. However, the Capstan simply multiplies the pull force which is applied to the end or "tail" of the wire and required that an operator must still be on hand, to gather it by hand. Thus, while requiring less effort than that required manually to pull the wire free of the frame shelf, the Capstan method proved to be not much faster than the manual-pull method and was abandoned for this and other various reasons.

The Invention

The present invention has solved the aforesaid problem by providing a grooved-gear wire puller of a construction and design such that an operator thereof is required but to insert one end of the wire to be pulled into an entry tube which directs the wire end into a groove-formed opening between intermeshing gear teeth, whereupon said puller exerts a continuing pull force (of the order of 30 lbs.) on the wire without any further action or attention thereto by the operator, and additionally imparts a succession of closely spaced crimps in the wire exiting from puller, which yields the unforseen advantage, assuming that the puller operates at an appreciable height above floor level, that the crimped wire exiting from the puller tends to coil itself with a minimum of attention in a cylindrical receptable such as a barrel or drum for storage until its disposal as "junk wire".

Such a grooved gear wire puller and the manner of its functioning are illustrated in the appended drawing views thereof, wherein FIG. 1 is a side elevational view of the subject wire puller, looking onto the outer-side faces of the grooved gear pair shown in full intermeshing relation;

Figure 4:
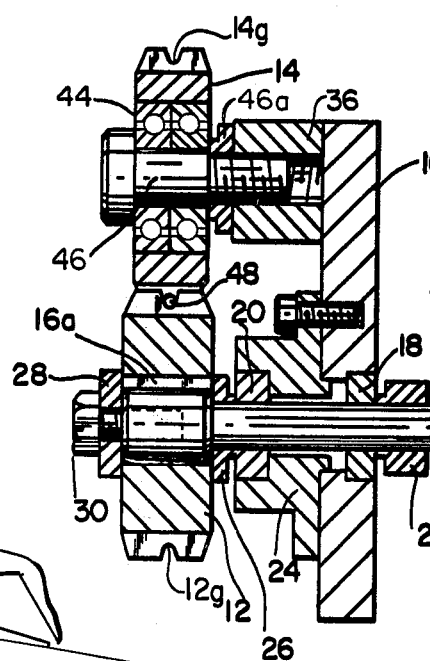
FIG. 4 is a section taken approximately on the vertical plane 4—4 of FIG. 1 which illustrates the preferred mounting of the positively driven lower gear of the gear pair; and further shows in phantom the driving motor and clutch mounted on the driveshaft.

Referring to said drawing views, reference numeral 10 designates a vertical plate-form support member mounting lower and upper spur-type grooved gears 12, 14 disposed in teeth intermeshing relationship, of which the lower gear 12 is positively driven via a drive shaft 16 (to which said gear is keyed by key 16a) which as seen in FIG. 4 extends through and projects beyond the vertical support member 10, being journalled in axially spaced-apart bearings 18, 20 which are secured in place axially of the drive shaft by collar 22 and bearing support 24 respectively. Illustratively, the said lower positively driven gear 12 is secured in a fixed axial position to said drive shaft end to which it is keyed as above by a spacing collar 26 and a flat washer 28 which is held against the outer side face of said gear as by a bolt 30.

Said upper gear 14 of the gear pair is mounted in position such that its teeth intermesh with the teeth of the lower positively driven gear in varying depths, depending on the downward bias imparted thereto via a stiff coil spring 32 encircling an uprightly disposed, pivotally mounted bolt 34, said spring being reactive between a flat upper surface on the outer end of a support arm 36 and a flat washer 38, the axial position of which latter on the bolt is set by a lock nut 40.

At its inner end, the support arm 36 is connected to the vertical support member 10 for pivotal motion in a vertical plane via a shoulder screw 42 and bushing 40 thus insuring free vertical motion of the upper gear 14 to allow for even pressure on the twisted wire as it progresses through the gear pair. Said upper gear 14, by reference to FIG. 4, is supported on bearing 44 in turn mounted on shoulder screw 46 threaded into a hole provided therefor in support arm 36 being spaced therefrom by spacer 46a.

As above forecast, the intermeshing teeth of the gears 12, 14 are each grooved, the grooves thereof which are designated 12g, 14g being disposed in mutually facing relation, thereby defining an aperture 48 (FIG. 4) in intermeshed teeth for the acceptance of the wire to be pulled which is inserted thereinto.

Preferably said grooves 12g, 14g are generally V-shaped with somewhat rounded apices and it is feature of the invention that said grooves have depth which is only slightly greater than half the depth (heighth) of the teeth in which they are formed, i.e., greater by but a few thousands of an inch. Thus, for all intents and purposes, the depth of the grooves is approximately one half the whole heights of the teeth in which they are formed.

Figure 2:
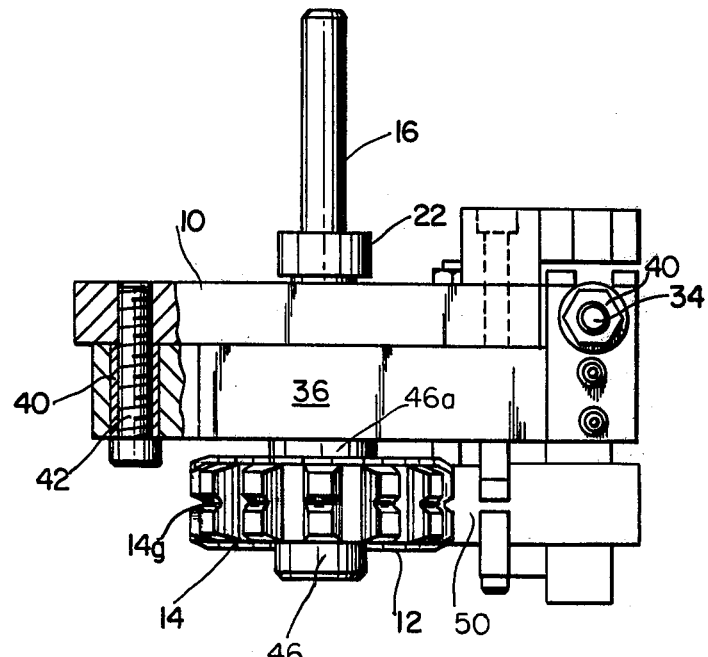
FIG. 2 is a plan view looking down on the puller, with certain parts shown in section.
Figure 1:
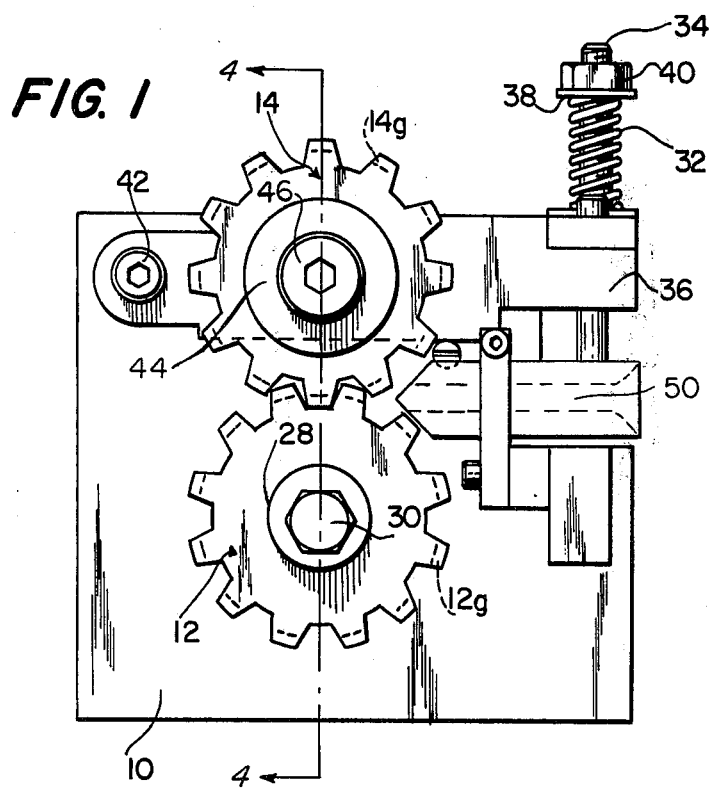
Figure 3:
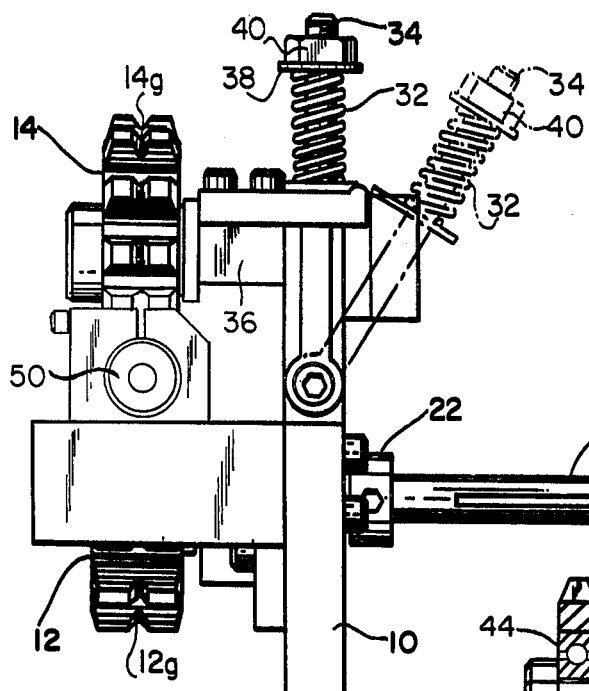
FIG. 3 is a front elevation of the puller of the invention which illustrates in broken lines the upper-gear biasing means in an inactive position to which it may be actuated when separation of the gears for clearing a jam is desired.

FIG. 1–3 inclusive further illustrate the provision of an elongate wire-entry nozzle 50 functioning to insure that the pair of twisted wires to be acted on, i.e., pulled and thereupon crimped, upon entry, is free of kinks, knots or the like and further that said entering wire extends straightway and in a substantially uniform plane prior to being acted upon by the grooved intermeshing teeth of the rotating gears 12, 14 which first grip and in so doing deform the wire out of its entering plane and finally crimp the wire so that it exists from between the intermeshing gear teeth with a succession of closely spaced crimps imparted thereto.

Figure 5:
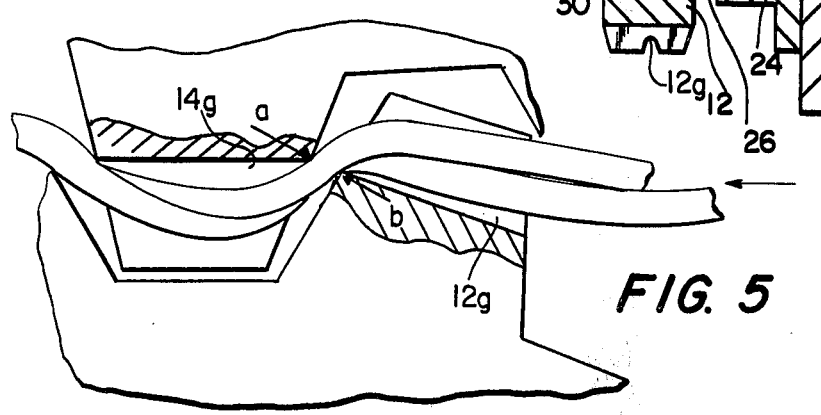
FIG. 5 is an enlarged view detailing the gripping and deforming action which each two intermeshing teeth of the gear pair impart on the wire to be pulled upon its insertion therebetween.
Figure 6:
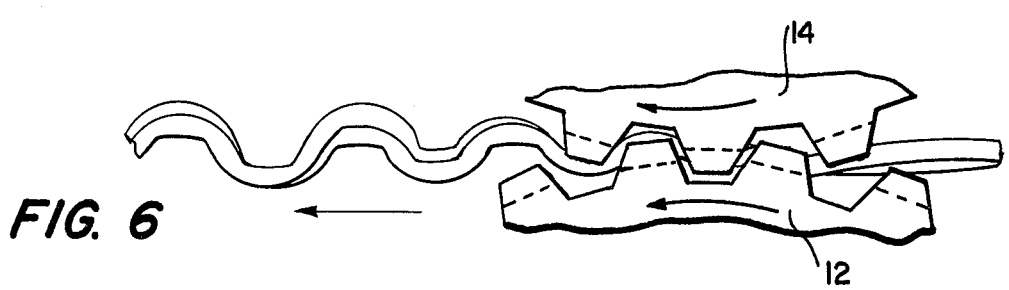
FIG. 6 is a view illustrating that the intermeshing gear teeth also impart a succession of spaced crimps in the inserted wire as it is gripped and pulled by said teeth upon rotation of the gear pair.

More particularly and as illustrated in FIGS. 5 and 6 on a somewhat exaggerated scale adopted in an attempt pictorially to show the aforesaid gripping and crimping action which the grooved gears 12, 14 have on a twisted wire pair consisting of a pair of loosely twisted wires, the pitch of said twisted wires, that is, the length thereof for the wires to twist a full 360° being approximately three inches.

Upon the loosely twisted wire pair being projected into the aforesaid opening 48 formed by the grooves 12g, 14g, the wires of the pair thereof are first gripped with substantial force between rotating opposite surfaces of the teeth designated by the oppositely pointing arrows a and b (FIG. 5), and thus pulled forwardly (as indicated by the directional arrows in each of FIGS. 5 and 6). While being so pulled the wires are also crimped, due to the undulating path which the twisted wire pair is forced to take in its progress through the successive gear-teeth openings, which as above explained have but limited depth.

Thus it will be understood that the twisted wire pair is subjected alternately to succession of substantial pull forces and to a succession of crimping forces, the latter as results in the twisted wire pair having a succession of well-defined crimps (undulations) showing therein as it emerges from between the gears, as such are attempted to be shown in FIG. 6.

Although the explanation thereof is not clear, the aforesaid crimping action yields the unexpected dividend of the crimped wire emerging from between the grooved gear pair tending to coil itself with but a minimum of attention in a cylindrical receptable such as a barrel or drum for storage pending its disposal as "junk" wire.

Finally, attention is directed to the provision herein of the upper-gear spring biasing means (also sometimes referred to as the upper-gear "spring tensioner"). Such is a feature of advantage, as it provides simple, easily operated means for gaining access to the gear-teeth opening provided by the grooves 12g, 14g, should a jam occur. Thus upon such a jam occuring one simply bodily moves the upper-gear spring biasing means to its broken-line position shown in FIG. 3, whereupon the upper gear 14 may be raised clear of the lower gear 12 via the pivoted support arm 36. Upon the jam being removed or cleared away, one then may drop the support arm 36 back to its working position and return the spring biasing means to its original (full-line) position, whereupon the unit is again ready to operate.

Although not illustrated because such is conventional, the grooved-gear wire puller of the invention may be provided with suitable mounting brackets enabling it to pivot bodily throughout an 180° arc whereby it is capable of pulling wires from both directions and/or allowing it to be column-mounted. Covers will be provided to extend over the gears and clutch. Preferably the cover extending over the gears will be hinged so as to give ready access to the gears in the event of the wire being jammed therebetween and further will be interlocked electrically with the motor so that the motor can not operate unless the cover is in closed position.

Without further analysis, it will be seen that the herein grooved-gear wire puller is designed to and does in fact satisfy a want which has existed in the particular art, for which no solution previously existed, in simple and effective manner and accordingly I make the following claims therefor.

I claim:

1. Wire pulling means comprising a pair of spur-type gears disposed one above the other, means for positively driving the lower gear of said pair thereof, means biasing the upper gear of said pair into substantially full tooth-meshing relationship with said lower gear, the teeth of both said gears being correspondingly grooved and the grooves thereof being disposed in mutually facing relationship thereby together defining an aperture for the acceptance of the wire to be pulled, means directing said wire in a substantially straight-line path into said aperture, the depth and configuration of said aperture and the degree of bias imparted to said upper gear being such that each pair of the intermeshing teeth first grip the entering wire between their opposite rotating side faces with a continuing high pull force and thereafter deform the gripped wire out of its entering stright-line path and in manner as to impart a succession of longitudinally spaced crimps to the wire exiting from between the intermeshing teeth, said gripping and deforming action being further such as to impart to the exiting wire a tendency to coil itself into a lower level receptacle positioned to receive same.

2. Wire pulling means according to claim 1, wherein said rotating intermeshing teeth grip same wire as aforesaid with a continuing pull force of the order of 30 pounds.

3. Wire pulling means according to claim 1 wherein the wire to be pulled initially has length varying up to approximately 200 feet and extends across a generally horizontal surface, and said intermeshing teeth are effective to pull said wire from said surface at a speed of approximately 120 feet per minute.

* * * * *